(12) United States Patent
Qin et al.

(10) Patent No.: US 8,125,112 B2
(45) Date of Patent: Feb. 28, 2012

(54) ELECTRIC MOTOR

(75) Inventors: Rui Feng Qin, Hong Kong (CN); Ling Yang, Shenzhen (CN); Bao Ting Liu, Shenzhen (CN); Chang Jin Zhou, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 222 days.

(21) Appl. No.: 12/689,828

(22) Filed: Jan. 19, 2010

(65) Prior Publication Data

US 2010/0183460 A1 Jul. 22, 2010

(30) Foreign Application Priority Data

Jan. 19, 2009 (CN) .......................... 2009 1 0105141

(51) Int. Cl.
*H02K 1/00* (2006.01)
(52) U.S. Cl. ........................ 310/194; 310/234
(58) Field of Classification Search .................. 310/198, 310/233, 234, 225, 231, 127, 128, 130, 204
See application file for complete search history.

(56) References Cited

U.S. PATENT DOCUMENTS 4,583,016 A * 4/1986 Ban et al. ...................... 310/198
(Continued)

FOREIGN PATENT DOCUMENTS

EP 1093208 4/2001

*Primary Examiner* — Nguyen N Hanh
(74) *Attorney, Agent, or Firm* — Muncy, Geissler, Olds & Lowe, PLLC

(57) ABSTRACT

A DC motor 12, has a stator housing 16 accommodating a permanent magnet stator and a rotor 15 rotatably mounted confronting the stator. The rotor 15 has a shaft 21, a rotor core 22 fitted to the shaft and having laminations forming salient poles or teeth 27. A commutator 23 is fitted to the shaft adjacent one end of the rotor core and windings 24 are wound about the teeth and terminated on segments of the commutator 23. The windings is formed by a number of coils with each coil being wound around a single tooth of the rotor and each tooth supporting a single coil. Brush gear comprising a plurality of brushes 26 in sliding contact with the commutator 23, transfers electrical power to the windings.

12 Claims, 6 Drawing Sheets

U.S. PATENT DOCUMENTS

| | | | |
|---|---|---|---|
| 4,876,472 A * | 10/1989 | Shiraki et al. | 310/198 |
| 7,928,629 B2 * | 4/2011 | Aoyama et al. | 310/248 |
| 2004/0256944 A1 * | 12/2004 | Kaneko | 310/233 |
| 2007/0152532 A1 * | 7/2007 | Roos et al. | 310/234 |

* cited by examiner

ELECTRIC MOTOR

CROSS REFERENCE TO RELATED APPLICATIONS

This non-provisional patent application claims priority under 35 U.S.C. §119(a) from Patent Application No. 200910105141.9 filed in The People's Republic of China on Jan. 19, 2009.

FIELD OF THE INVENTION

This invention relates to an electric motor having a wound rotor with a commutator, and in particular, to a multi-pole PMDC motor having a concentrated winding and to a cooling fan module incorporating such a motor. The term 'multi-pole' is used here to mean motors having four or more stator poles. The invention has particular application to PMDC motors having six or eight stator poles.

BACKGROUND OF THE INVENTION

PMDC motors are well-known and have many uses. The current trend, driven by customer demand, is for smaller, lighter and/or more powerful motors. One such application is for the fan motor of a cooling module for a vehicle engine. Space is always a premium in the modern vehicle engine compartment and weight is a prime target for reducing fuel consumption. Hence the desire for a smaller, lighter motor, without a reduction in performance.

Increasing the number of stator poles say from two poles to four poles, increases the power density, which is important when trying to increase the performance of the motor. However, other factors are also affected. Normally when reducing the physical size of a motor, the performance will be downgraded, if no other design changes are made.

Wound rotors with commutators are commonly used in PMDC (permanent magnet direct current), motors. This type of rotor has a number of salient poles or teeth about which the armature windings are wound. The windings form coils about the teeth and the rotor has a number of slots which form winding tunnels through which the windings extend. The coils thus have two axially extending portions which lie within the slots and two end portions, known as heads, which extend transversely to the axial direction of either axial end of the rotor core. The heads provide no force and serve only to provide electrical connections between the axially extending portions of the coil. In most rotors, some of the heads cover or cross over other heads due to the arrangement of the coils and the winding technique. Thus, some heads must extend axially out from the rotor core a considerable distance in order to cross one, two or more preciously wound heads. This distance adds nothing to the motor performance but does add to the axial length of the motor and of course, to the total amount of wire used to form the coils.

One known way of reducing the head height is described in European Patent No. EP 1093208 by Gate SPA shows a four pole, twenty slot motor having an armature lamination known as an asymmetric lamination. The asymmetric lamination was designed to reduce the winding head height by reducing or eliminating winding head overlap. However, this design proves to be difficult to successfully put into production due to the complex slot shapes.

Another way is to use a winding technique known as concentrated winding. A concentrated winding is a winding which is wound around a single pole. In this way, the head height is kept to a minimum, because no coils overlap coils of another pole. However, for an armature with many rotor poles, concentrated windings are usually not a option especially for miniature and small sized PMDC motors.

As the rotor poles are produced by making slots in the rotor core, the rotor pole number is often referred to as the rotor slot number, or simply as the slot number to reduce confusion with the stator pole number, which is then referred to simply as the pole number. Commutator segments are commonly referred to as bars. Thus a motor with 6 stator poles, 9 rotor poles and a commutator with 18 segments is referred to as a 6 pole 9 slots 18 bar motor. This convention will be used in this specification, where appropriate. When the number of bars equals the number of slots, it is usual to not mention the number of bars. To avoid confusion between stator poles and rotor poles, the terms tooth and teeth may be used when referring to the rotor poles.

SUMMARY OF THE INVENTION

Thus, it is desirable to reduce the weight and size of a PMDC motor without reducing its performance or power. Also it is desirable to achieve this, even for a PMDC motor, having more than four stator poles. Multi-pole motors (i.e. motors with more than four stator poles) are becoming popular as a way to handle high power density applications.

One preferred way to achieve this is to reduce the axial length of the motor, making the motor more compact, lighter and reducing the amount of wire used, thus saving material cost. One way of doing this is by using a rotor with concentrated windings.

The present invention aims to reduce the problems associated with known concentrated winding motors by providing a simple winding scheme which gives improved motor performance in a multiple pole PMDC motor.

Accordingly, in one aspect thereof, the present invention provides a DC motor, comprising: a stator housing accommodating a permanent magnet stator having 2n stator poles; a rotor, rotatably mounted confronting the stator, the rotor comprising a shaft, a rotor core fitted to the shaft, a commutator fitted to the shaft adjacent one end of the rotor core, windings wound about teeth of the rotor core and electrically connected to segments of the commutator; and brush gear comprising a plurality of brushes in sliding contact with the commutator for transferring electrical power to the windings, wherein the rotor core has m rotor teeth and the rotor windings has m coils each coil being wound about a respective single one of the rotor teeth and each rotor tooth supporting one of said coils, and the commutator has 2m segments with each coil being connected to a respective pair of commutator segments and at least one segment being directly connected to only one of the coils, at least one segment being directly connected to two of the coils, and at least one segment being directly connected to none of the coils.

Preferably, each of the coils is connected to a respective pair of adjacent commutator segments.

Preferably, the winding is arranged such that each coil is connected, at one end, to a coil wound in the opposite direction.

Preferably, the two coils directly connected to a same commutator segment are wound in opposite directions.

Preferably, each coil is connected to another coil wound about an adjacent tooth.

Preferably, the two coils directly connected to a same commutator segment are wound about two adjacent teeth respectively.

Preferably, m is equal to 3n.

Preferably, the brush gear has less than n pairs of brushes.

Preferably, the rotor has a plurality of equalizers electrically connecting together selected segments of the commutator; the at least one segment being directly connected to none of the coils is connected to at least one of the coils via a respective equalizer.

Preferably, the motor has six stator poles, nine teeth, four brushes unequally spaced circumferentially about the commutator, and the commutator has eighteen segments and six equalizers, each of the equalizers electrically connecting together a respective group of four of the segments, said four segments being evenly space circumferentially about the commutator.

Alternatively, the bush gear has four or six brushes, the rotor has twelve teeth and the stator has eight stator poles, the brushes being unequally spaced about the commutator, and the commutator has segments and six equalizers, each equalizer electrically connecting together a respective group of four of the segments, said four segments being evenly space circumferentially about the commutator.

According to a second aspect, the present invention also provides a cooling fan module for an internal combustion engine of a vehicle, comprising: a fan; a housing; and a DC motor as described above, wherein the fan is driven by the motor and the motor is supported by the housing.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
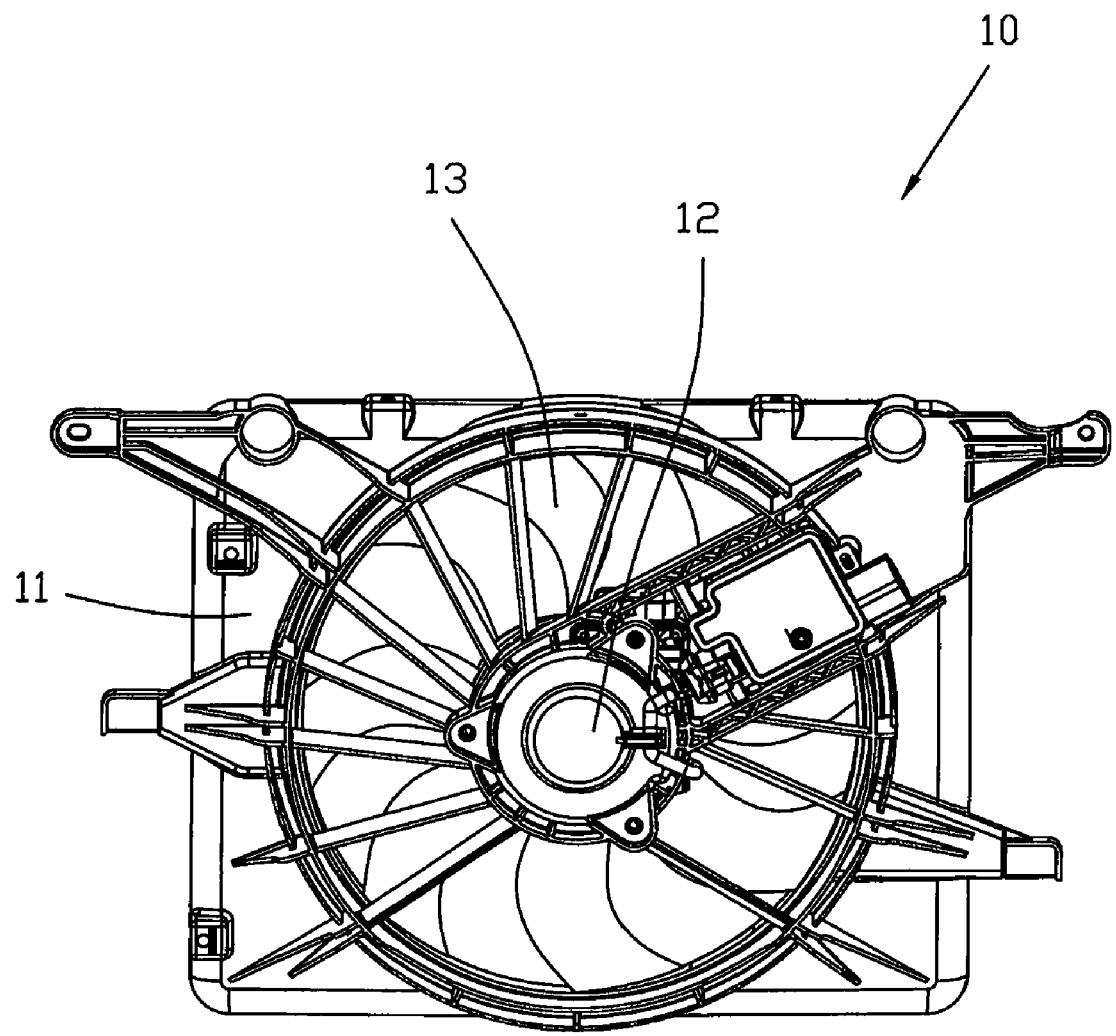
FIG. 1 illustrates a cooling fan module for a radiator of a car, incorporating a motor according to the present invention.

FIG. 1 shows a cooling fan module 10 as used for example for cooling a radiator of a vehicle. The module has a housing 11 forming a fan cowling, adapted to mate with the radiator or the like. The housing supports an electric motor 12 which drives a fan 13 for generating the flow of cooling air.

Figure 2:
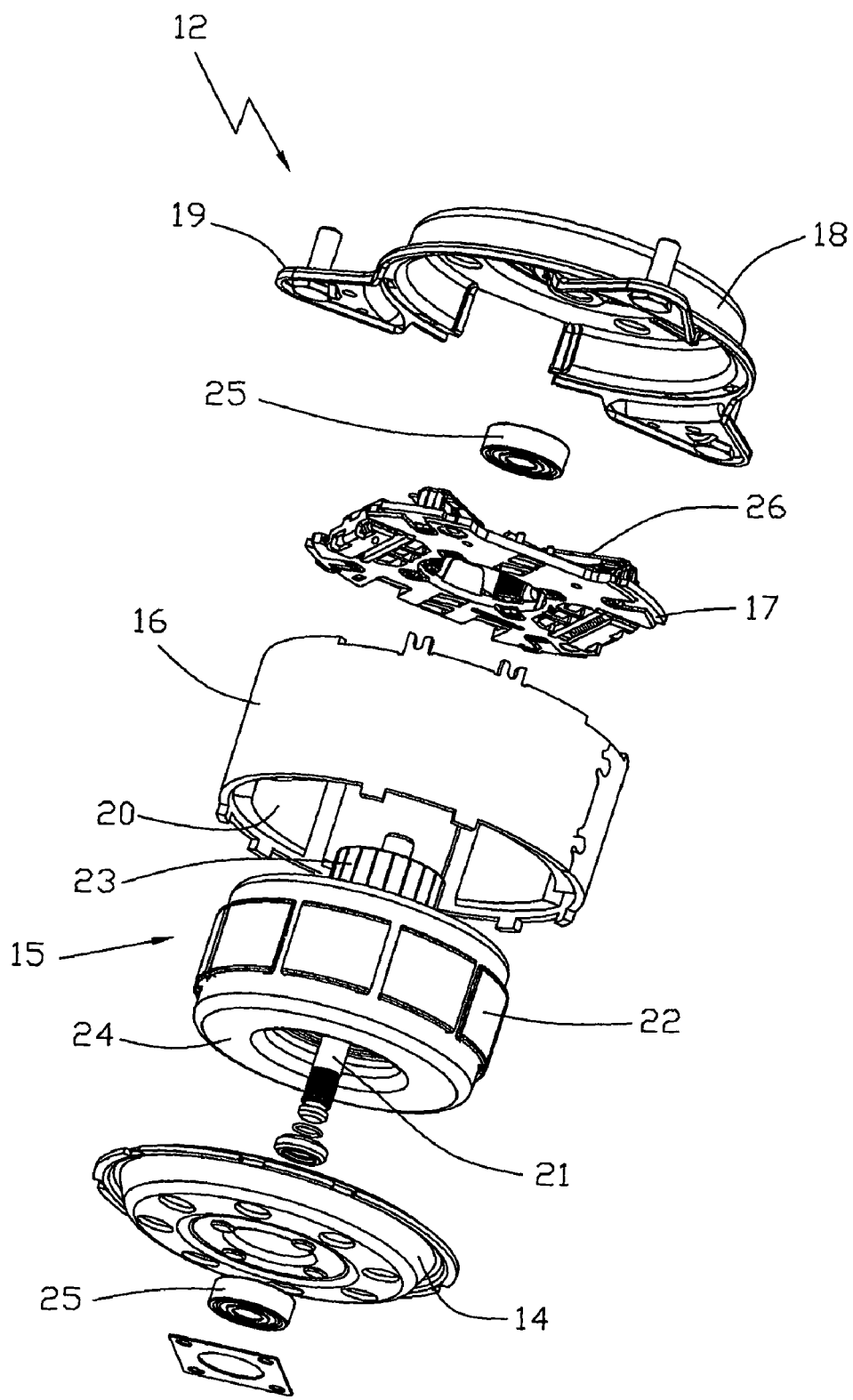
FIG. 2 is an exploded view of the motor of the cooling fan module of FIG. 1.

FIG. 2 is an exploded view of the motor 12. The motor has a first end cap 14, a rotor 15, stator housing 16, brush gear in the form of a brush card 17 supporting brushes 26, and a second end cap 18 which has mounting projections 19 for fixing the motor to the module housing. The stator housing 16 supports a permanent magnet stator which, in this case, comprises six permanent magnets 20. The stator housing has open ends which are closed by the two end caps 14, 18. The rotor 15 has a shaft 21, a core 22 fitted to the shaft 21, a commutator 23 fitted on the shaft adjacent one end of the core and windings 24 wound about teeth (salient rotor poles) of the core and terminated on the commutator. The rotor 15 is mounted within the housing with the core confronting the stator and the shaft 21 being rotatably supported in bearings 25 held by the end caps 14, 18. The shaft 21 extends through the first end cap 14 so as to engage the fan. The brush card 17 is located adjacent to and is preferably supported by the second end cap 18. The brush card 17 supports brushes slidably received in brush cages for making sliding contact with the commutator 23. In this example, there are six permanent magnets providing six stator poles and four brushes engaging the commutator at circumferentially spaced locations.

Rotor windings are represented in FIG. 2 by mass 24 on the core 22. In practice, the windings, which are coils of wire, are wound around individual teeth of the core, one coil per tooth. Each coil has two axial portions and two transverse portions. The axial portions extend axially through the rotor. The transverse portions extend in a direction transverse to the axis of the rotor and merely connect the axial portions. The transverse portions are also known as the winding heads.

Figure 3:
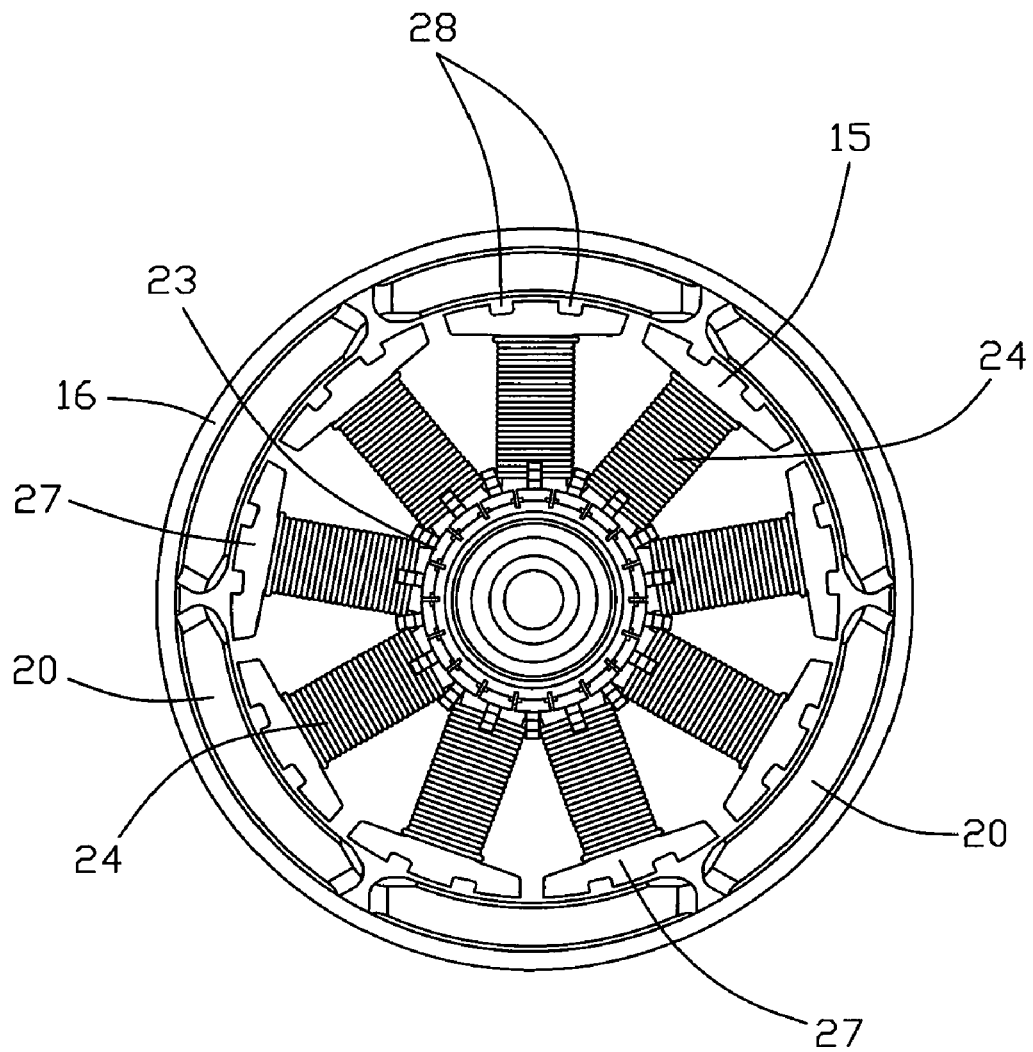
FIG. 3 is a cross sectional schematic of a 6 pole, 9 slot, 18 bar motor according to a first preferred embodiment.

As shown in FIG. 3, the stator includes the stator housing 16, and six magnets 20 forming the stator poles. The rotor 15 includes: a rotor core 22 which has nine T-shaped teeth 27; rotor windings 24 wound on each tooth; and an eighteen-segment commutator 23.

The rotor core 22 is formed by stacking together a number of laminations stamped from sheet metal material such as mild steel and silicon steel. An insulating layer, known as a spider, not shown, is located on both axial ends of the stack of laminations to protect the windings from any sharp edges of the rotor core. Each spider is made from an electrically insulating material and is preferably an injection molded plastics part. An alternative to the spider is an epoxy coating applied to the core before winding the coils. However, the epoxy coating is more expensive and time consuming to apply.

Each tooth 27 is identical and has a face which faces the stator across an air gap. Each tooth 27 has two grooves 28 extending axially along the face of the tooth. Each pair of grooves 28 are equally spaced circumferentially from the center line of the tooth.

Figure 4:
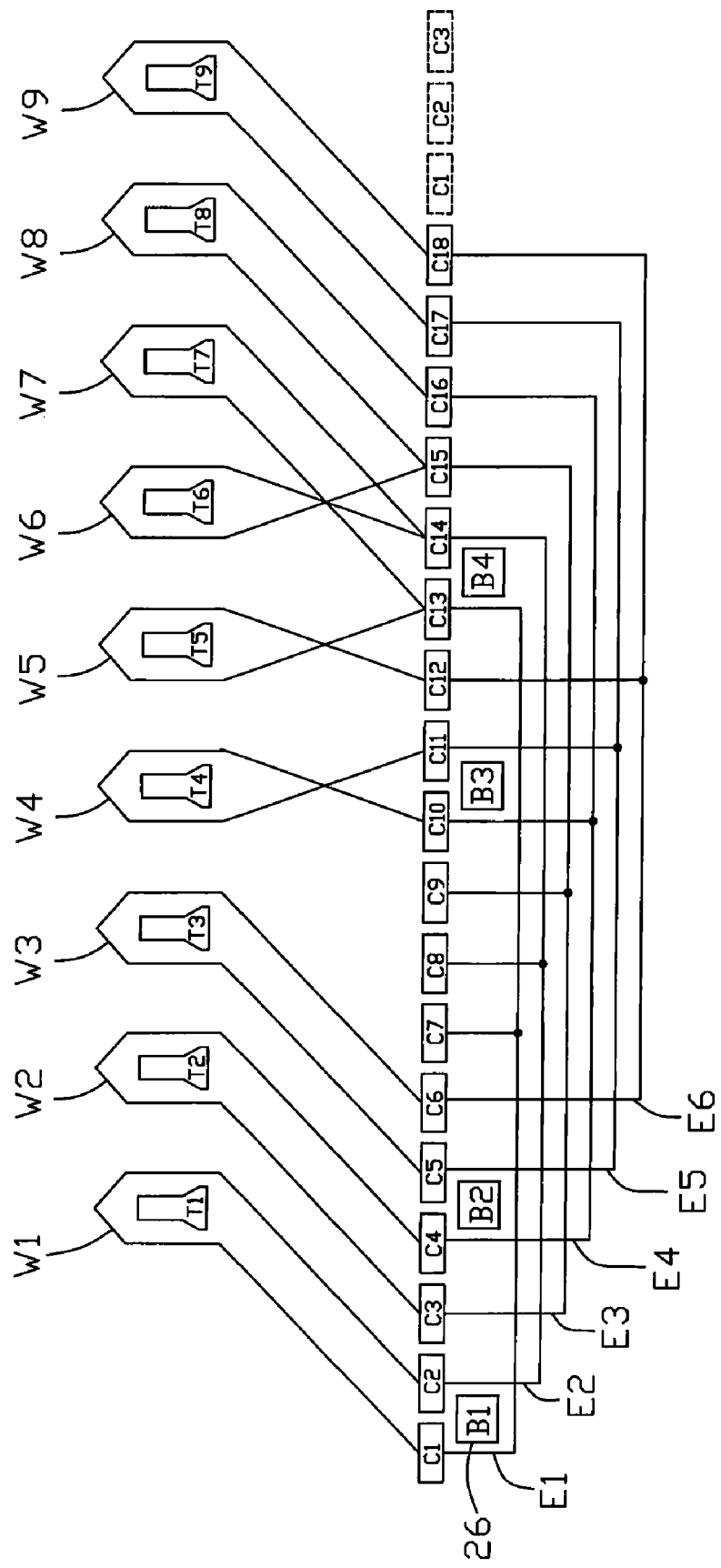
FIG. 4 is a winding schematic of the motor of FIG. 3.

FIG. 4 is a developed winding diagram of the motor of FIG. 3, with the components for the rotor laid out linearly. The teeth, commutator segments, brushes and the windings are shown schematically. The teeth T1 to T9 are laid flat along the top row. The commutator segments C1 to C18 are laid flat along the second row. Commutator segments C1 to C3 are repeated at the end of the row for ease of drawing the windings. Each tooth has a single winding. The windings are represented by lines W1 to W9. Brushes B1 to B4 are shown beneath the commutator segments in approximate spaced locations.

The winding process will now be described. Winding is started by connecting one end of the armature wire to a commutator segment, say C1. The wire is then wounded around tooth T1 in a clockwise direction (CW), and terminated on commutator segment C2, forming coil W1. The wire is then connected to segment C3 and wound in a clockwise direction about tooth T2 to form winding W2 and terminated on segment C4. The wire is then connected to segment C5, wound in a clockwise direction about tooth T3 to form winding W3 and terminated on segment C6. The wire is then connected to segment C10, wound in a counter-clockwise (CCW) direction about tooth T4 to form winding W4 and terminated on segment C11. The wire is then connected to segment C12, wound in a counter-clockwise direction about tooth T5 to form winding W5, connected to segment C13, wound in a clockwise direction about tooth T7 to form winding W7, connected to segment C14, wound in a counter-clockwise direction about tooth T6 to form winding W6, connected to segment C15, wound in a clockwise direction about tooth T8 to form winding W8 and terminated on segment C16. The wire is then connected to segment C17, wound in a clockwise direction about tooth T9 to form winding W9 and terminated on segment C18.

As shown in FIG. 4, all of the coils are respectively connected to two adjacent segments. Six of the coils are wound in a forward direction while three of the coils are wound in the reverse direction. One of the reverse wound coils W6 is connected between two adjacent segments C14, C15 connected to forward wound coils W7, W8, and one of the forward wound coils W7 is connected between two adjacent segments C13, C14 connected to reverse wound coils W5, W6. In other words, segment C13 as well as segment C14 is connected directly to two coils. The two coils connected directly to segment C13 are wound in CW direction and CCW direction, respectively. The two coils connected directly to segment C14 are wound in CW direction and CCW direction, respectively.

The brushes B1 to B4 are not equally spaced about the commutator. For a 6 pole motor, one would expect 6 brushes, i.e. 3 pairs. However, this is expensive and the present embodiment uses 4 brushes, i.e. 2 pairs of brushes. As such, the brushes are spaced in diametrically opposed pairs, with the pairs spaced as though there were 3 pairs of brushes and then 1 pair of brushes removed, i.e., one pair, B1 and B3, are spaced from the second pair, B2 and B4, by 60 degrees. That is, B1 is 60° from B2 which is 120° from B3 which is 60° from B4 which is 120° from B1. Brushes B1 and B4 are of the same polarity and are electrically connected together and may be, say, the positive brushes. Likewise, brushes B2 and B3 are of the same polarity and are electrically connected together and are, say, the negative brushes.

To compensate for the loss of the third pair of brushes, six equalizers E1 to E6 are used. Each equalizer electrically connects together three equally spaced commutator segments, thereby allowing the motor to operate as if it had three pairs of brushes. Each of the segments are connected to an equalizer, including segments C7, C8 or C9 that are not connected directly to any coils, thus the segments C7, C8 and C9 are indirectly connected to coils via the equalizers. In the present embodiment, three segments C1, C7 and C13 are connected to equalizer E1, and three coils W1, W5 and W7 are connected to the three segments. Three segments C2, C8 and C14 are connected to equalizer E2, and three coils W1, W6 and W7 are connected to the three segments and so forth. In the present embodiment, the number of segments that are connected to a same equalizer is three, equal to the number of coils that are connected to the segments.

Although, in theory, a single pair of brushes could be used, the use of two pairs of brushes reduces the maximum current carried by each brush allowing the use of brushes with smaller cross sectional areas or to simply reduce the current density in the brushes. The equalizers may be external but are preferably located within the body of the commutator.

Figure 5:
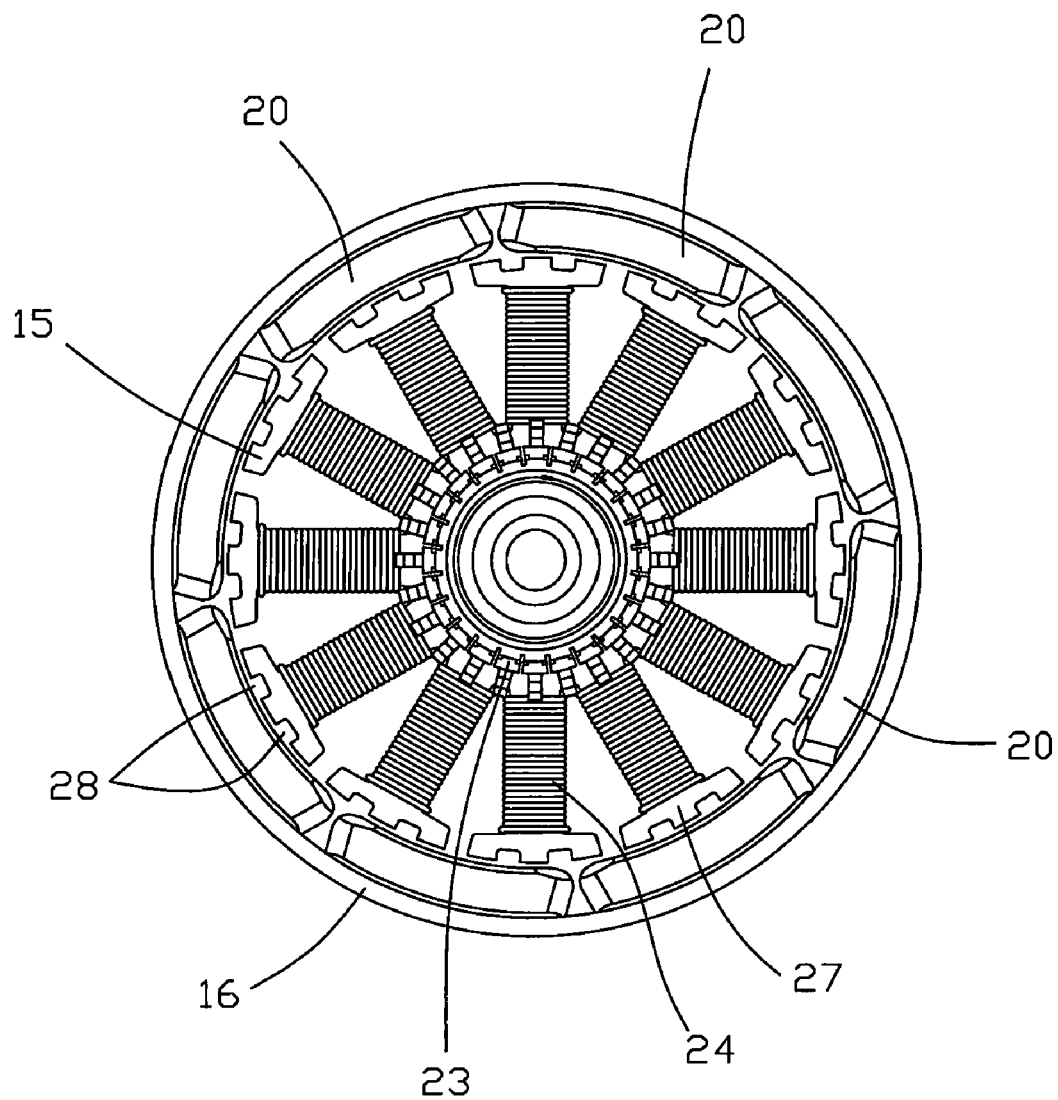
FIG. 5 is a cross sectional schematic, similar to FIG. 3, of a 8 pole, 12 slot, 24 bar motor according to a second preferred embodiment.
Figure 6:
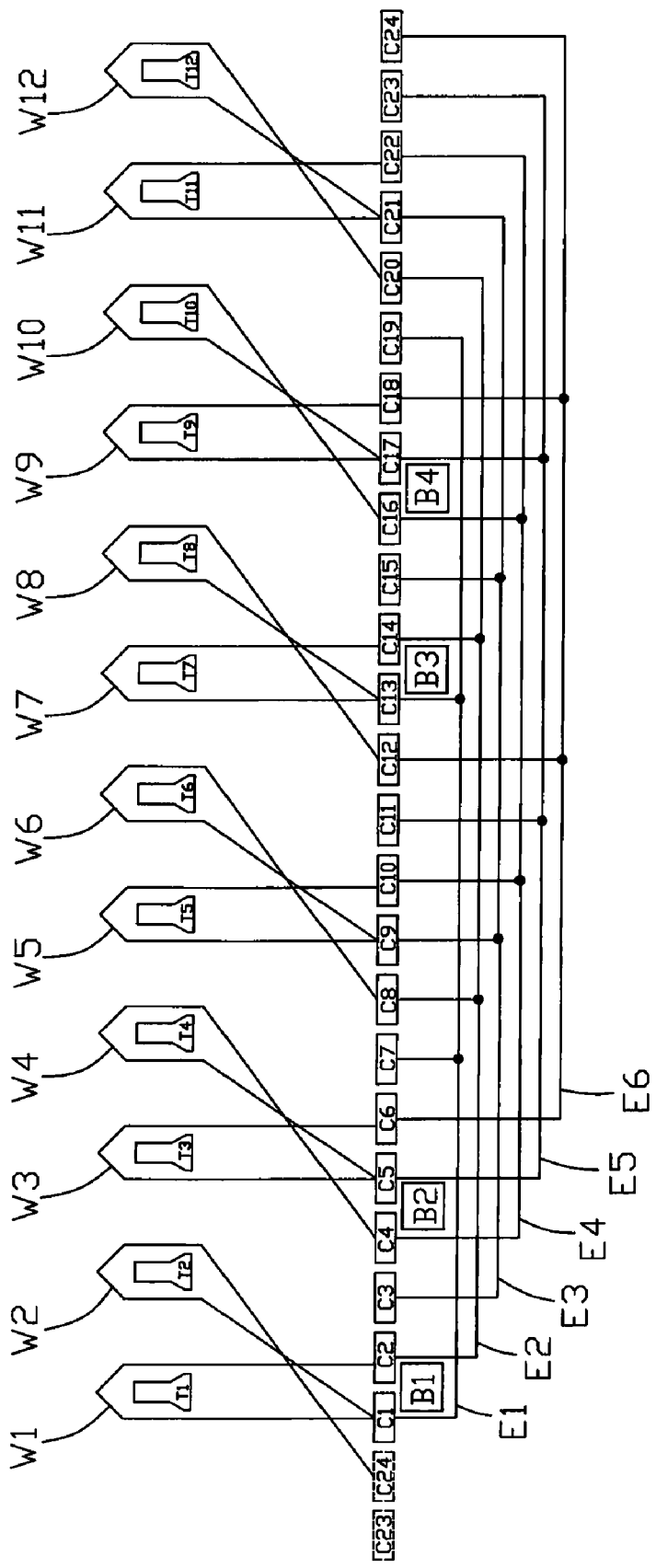
FIG. 6 is a winding schematic of the motor of FIG. 5.

FIGS. 5 and 6 illustrate another embodiment of the present invention. The motor is an 8 pole (8 stator poles) 12 slot (12 rotor poles) 24 bar (24 commutator segments) PMDC motor. For an eight pole motor, one would expect 8 brushes, i.e. 4 pairs. However, this embodiment uses 4 brushes, i.e. 2 pairs of brushes. The brushes are spaced circumferentially about the commutator and the diagonally opposite brushes are electrically connected together. The spacing of the brushes is as though there were four pairs of diagonally opposed brushes equally spaced about the commutator and then two of the pairs of brushes removed. Thus the remaining brush pairs may be spaced by 45° as shown schematically in FIG. 6. The diagonally opposed brushes are electrically connected together, i.e., brushes B1 and B3 are of the same polarity and are, for example, the positive brushes and brushes B2 and B4 are electrically connected together and are say the negative brushes.

The stator includes a stator housing and eight magnet poles. The rotor includes a rotor core which has twelve teeth, twelve windings, and a twenty-four-segment commutator.

FIG. 6 is a developed winding diagram of the armature of FIG. 5, similar to that of FIG. 4. The teeth, commutator segments, brushes and the windings are shown schematically. The teeth T1 to T12 are laid flat along the top row. The commutator segments C1 to C24 are laid flat along the second row. Commutator segments C23 & C24 are repeated at the beginning of the row for ease of drawing the windings. The windings are represented by lines W1 to W12. Each tooth has a single winding and each winding is wound about a single tooth. Brushes B1 to B4 are shown beneath the commutator segments in approximate spaced locations.

The winding process will now be described. Winding is started by connecting one end of the armature wire to a commutator segment, say C24. The wire is then wounded around tooth T2 in a counter-clockwise direction (CCW) to form coil W2, connected to segment C1, then wound around tooth T1 in a clockwise direction (CW) to form coil W1, and then terminated on segment C2. The wire is then connected to segment C4, wounded around tooth T4 in a counter-clockwise direction (CCW) to form coil W4, connected to segment C5, then wound around tooth T3 in a clockwise direction (CW) to form coil W3, and terminated on segment C6. The wire is then connected to segment C8, wounded around tooth T6 in a counter-clockwise direction (CCW) to form coil W6, connected to segment C9, then wound around tooth T5 in a clockwise direction (CW) to form coil W5, and terminated on segment C10. The wire is then connected to segment C12, wounded around tooth T8 in a counter-clockwise direction (CCW) to form coil W8, connected to segment C13, then wound around tooth T7 in a clockwise direction (CW) to form coil W7, and then terminated on segment C14. The wire is then connected to segment C16, wounded around tooth T10 in a counter-clockwise direction (CCW) to form coil W10, connected to segment C17, then wound around tooth T9 in a clockwise direction (CW) to form coil W9, and terminated on segment C18. The wire is then connected to segment C20, wounded around tooth T12 in a counter-clockwise direction (CCW) to form coil W12, connected to segment C21, then wound around tooth T11 in a clockwise direction (CW) to form coil W11, and terminated on segment C22.

To compensate for the loss of the third and fourth pairs of brushes, there are six equalizers E1-E6, each linking together four commutator segments. Thus each segment is electrically connected to another segment spaced apart by 90°, thereby allowing the motor to operate as if it had four pairs of brushes. For example, segments C1, C7, C13 and C19 are electrically connected together via equalizer E1, and coils W1, W2, W7 and W8 are electrically connected to the four segments, and so forth.

With two pairs of brushes, the equalizers provide power to the segments which should be in contact with the missing brushes thus allowing the motor to operate as though it had four pairs of brushes. Thus the pairs of brushes are electrically connected in parallel to share the load and the equalizers prevent the problems associated with current circulating between the brushes. The use of the equalizers allows the motor to use 1, 2 or 3 pairs of brushes, although 2 pairs are preferred.

As viewed in FIG. 6, the coils are wound in sequential pairs, which are connected to sequential segments of the commutator. One coil of each pair is wound clockwise while the other coil of the pair is wound counter-clockwise. Also, the segments to which the coils of each coil pair are connected is physically sequentially opposite. The pair of coils are connected to three sequential segments and the left coil of the pair of coils is connected to the right side segments of the adjacent segments to which the coils are connected.

Operation of the motors will now be described. When power is supplied to the motor terminals, current flows through selected coils because of the brushes contacting selected segments. The current flows through one brush, through one segment then through various coils to create the magnetic force required to drive the rotor in conjunction with the magnets of the stator. As the power flows from the positive brushes to the negative brushes, some teeth (rotor poles) become North poles and some teeth (rotor poles) become South poles which react with the stator poles to drive the rotor.

Taking the first embodiment of FIGS. 3 & 4 as the first example and assuming that brushes B1 and B4 are the positive brushes with brush B1 contacting segment C1 and brush B4 contacting segment C13, and brushes B2 and B3 are the negative brushes with brush B2 contacting segment C4 and brush B3 contacting segment C10, the current paths and the resulting magnetic field are now described.

The current flows through positive brushes B1, B4 through segments C1, C7, C13 into two parallel paths, one through coils W1/W7 (W1 and W7 are parallel connected by equalizer E1, E2), W6, W2/W8 (W2 and W8 are parallel connected by equalizer E3, E4), the other through coils W5, W3/W9 (W3 and W9 are parallel connected by equalizer E5, E6), W4 through segments C4, C10, C16 to negative brushes B2, B3.

This creates the following magnetic poles on the rotor. Teeth T3, T6, T9 become North poles, and teeth T1, T2, T4, T5, T7, and T8 become South poles which react with the stator poles to cause the rotor to rotate in CCW direction.

As the rotor turns the brushes move over the commutator, making contact with successive segments creating the following change in the magnetic field of the rotor.

When brush B1 contacts segments C1, C2, brush B4 contacts segments C13, C14, brush B2 contacts segments C4, C5, and brush B3 contacts segments C10, C11, teeth T3, T6, T9 become North poles, and teeth T2, T5, T8 become South poles which react with the stator poles to continue to drive the rotor in CCW direction.

When brush B1 contacts segment C2, brush B4 contacts segment C14, brush B2 contacts segment C5, and brush B3 contacts segment C11, teeth T1, T3, T4, T6, T7, T9 become North poles, and teeth T2, T5, T8 become South poles which react with the stator poles to drive the rotor in CCW direction.

When brush B1 contacts segments C2,C3, brush B4 contacts segments C14, C15, brush B2 contacts segments C5, C6, and brush B3 contacts segments C11, C12, teeth T1, T4, T7 become North poles, and teeth T2, T5, T8 become South poles which react with the stator poles to drive the rotor in CCW direction.

When brush B1 contacts segment C3, brush B4 contacts segment C15, and brush B2 contacts segment C6, brush B3 contacts segment C12, teeth T1, T4, T7 become North poles, and teeth T2, T3, T5, T6, T8, T9 become South poles which react with the stator poles to drive the rotor in CCW direction.

When brush B1 contacts segments C3, C4, brush B4 contacts segments C15, C16, brush B2 contacts segments C6, C7, and brush B3 contacts segments C12, C13, teeth T1, T4, T7 become North poles, and teeth T3, T6, T9 become South poles which react with the stator poles to drive the rotor in CCW direction.

When brush B1 contacts segment C4, brush B4 contacts segment C16, brush B2 contacts segment C7, and brush B3 contacts segment C13, teeth T1, T2, T4, T5, T7, T8 become North poles, and teeth T3, T6, T9 become South poles which react with the stator poles to drive the rotor in CCW direction.

When brush B1 contacts segments C4, C5, brush B4 contacts segments C16, C17, brush B2 contacts segments C7, C8, and brush B3 contacts segments C13, C14, teeth T2, T5, T8 become North poles, and teeth T3, T6, T9 become South poles which react with the stator poles to drive the rotor in CCW direction.

When brush B1 contacts segment C5, brush B4 contacts segment C17, brush B2 contacts segment C8, and brush B3 contacts segment C14, teeth T2, T5, T8, become North poles, and teeth T1, T3, T4, T6, T7, T9 become South poles which react with the stator poles to drive the rotor in CCW direction.

When brush B1 contacts segments C5, C6, brush B4 contacts segments C17, C18, brush B2 contacts segments C8, C9, and brush B3 contacts segments C14, C15, teeth T2, T5, T8 become North poles, and teeth T1, T4, T7 become South poles which react with the stator poles to drive the rotor in CCW direction.

When brush B1 contacts segment C6, brush B4 contacts segment C18, brush B2 contacts segment C9, and brush B3 contacts segment C15, teeth T2, T3, T5, T6, T8, T9 become North poles, and teeth T1, T4, T7 become South poles which react with the stator poles to drive the rotor in CCW direction.

When brush B1 contacts segments C6, C7, brush B4 contacts segments C18, C1, brush B2 contacts segments C9, C10, and brush B3 contacts segments C15, C16, teeth T3, T6, T9 become North poles, and teeth T1, T4, T7 become South poles which react with the stator poles to drive the rotor rotates in CCW direction.

As the rotor continues to move, brush B1 contacts segment C7, brush B4 contacts segment C1, brush B2 contacts segment C10, and brush B3 contacts segment C16, and the cycle repeats due to the equalizers.

Looking now at the second embodiment of FIGS. 5 & 6 as the second example and assuming that brushes B1 and B3 are the positive brushes with brush B1 contacting segment C1 and brush B3 contacting segment C13, and brushes B2 and B4 are the negative brushes with brush B2 contacting segment C4 and brush B4 contacting segment C16, the current paths and the resulting magnetic fields are now described.

The current flows through positive brushes B1, B3 through segments C1, C7, C13, C19 into four parallel paths, one through coils W1, W6, W5, another through coils W7, W12, W11, a third through coils W2, W9, W10, and the fourth through coils W8, W3, W4 through segments C4, C10, C16, C22 to negative brushes B2, B4.

This creates the following magnetic poles on the rotor. Teeth T3, T6, T9, and T12 become North poles, and teeth T1, T2, T4, T5, T7, T8, T10, and T11 become South poles which react with the stator poles to cause the rotor to rotate in the CCW direction.

As the rotor turns the brushes move over the commutator, making contact with successive segments creating the following change in the magnetic field of the rotor.

When brush B1 contacts segments C1, C2, brush B3 contacts segments C13, C14, brush B2 contacts segments C4, C5, and brush B4 contacts segments C16, C17, teeth T3, T6, T9, T12 become North poles, and teeth T2, T5, T8, T11 become South poles which react with the stator poles to continue driving the rotor in CCW direction.

When brush B1 contacts segment C2, brush B3 contacts segment C14, brush B2 contacts segment C5, and brush B4 contacts segment C17, teeth T1, T3, T4, T6, T7, T9, T10, T12 become North poles, and teeth T2, T5, T8, T11 become South poles which react with the stator poles to drive the rotor in CCW direction.

When brush B1 contacts segments C2,C3, brush B3 contacts segments C 14, C15, brush B2 contacts segments C5, C6, and brush B4 contacts segments C17, C18, teeth T1, T4, T7, T10 become North poles, and teeth T2, T5, T8, T11 become South poles which react with the stator poles to drive the rotor in CCW direction.

When brush B1 contacts segment C3, brush B3 contacts segment C15, brush B2 contacts segment C6, and brush B4 contacts segment C18, teeth T1, T4, T7, T10 become North poles, and teeth T2, T3, T5, T6, T8, T9, T11, T12 become South poles which react with the stator poles to drive the rotor in CCW direction.

When brush B1 contacts segments C3, C4, brush B3 contacts segments C15, C16, brush B2 contacts segments C6, C7, and brush B4 contacts segments C18, C19, teeth T1, T4, T7, T10 become North poles, and teeth T3, T6, T9, T12 become South poles which react with the stator poles to drive the rotor in CCW direction.

When brush B1 contacts segment C4, brush B3 contacts segment C16, brush B2 contacts segments C7, and brush B4 contacts segment C19, teeth T1, T2, T4, T5, T7, T8, T10, T11 become North poles, and teeth T3, T6, T9, T12 become South poles which react with the stator poles to drive the rotor in CCW direction.

When brush B1 contacts segments C4, C5, brush B3 contacts segments C16, C17, brush B2 contacts segments C7, C8, and brush B4 contacts segments C19, C20, teeth T2, T5, T8, T11 become North poles, and teeth T3, T6, T9, T12 become South poles which react with the stator poles to drive the rotor in CCW direction.

When brush B1 contacts segment C5, brush B3 contacts segment C17, brush B2 contacts segment C8, and brush B4 contacts segment C20, teeth T2, T5, T8, T11 become North poles, and teeth T1, T3, T4, T6, T7, T9, T10, T12 become South poles which react with the stator poles to drive the rotor in CCW direction.

When brush B1 contacts segments C5, C6, brush B3 contacts segments C17, C18, brush B2 contacts segments C8, C9, and brush B4 contacts segments C20, C21, teeth T2, T5, T8, T11 become North poles, and teeth T1, T4, T7, T10 become South poles which react with the stator poles to drive the rotor in CCW direction.

When brush B1 contacts segment C6, brush B3 contacts segment C18, brush B2 contacts segment C9, and brush B4 contacts segment C21, teeth T2, T3, T5, T6, T8, T9, T11, T12 become North poles, and teeth T1, T4, T7, T10 become South poles which react with the stator poles to drive the rotor in CCW direction.

When brush B1 contacts segments C6, C7, brush B3 contacts segments C18, C19, brush B2 contacts segments C9, C10, and brush B4 contacts segments C21, C22, teeth T3, T6, T9, T12 become North poles, and teeth T1, T4, T7, T10 become South poles which react with the stator poles to drive the rotor in CCW direction.

As the rotor continues to move, brush B1 contacts segment C7, brush B3 contacts segment C19, brush B2 contacts segment C10, and brush B4 contacts segment C22, and the cycle repeats due to the equalizers.

With this unique and novel winding design, the copper weight is reduced, efficiency is improved or steel weight can be further reduced with equal performance, axial length of armature and motor are reduced, and total motor cost is minimized.

Certain embodiments of this invention are particularly suited for use as motors for driving the fan of a cooling fan module used in vehicles to cool the radiator and/or condenser of an air-conditioning unit.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the invention is described with reference to preferred embodiments, it will occur to persons of the art that various modifications are possible. Therefore, the scope of the invention is to be determined only by reference to the claims that follow.

For example, while the motors of the preferred embodiments show brush gear having only 4 brushes and the use of equalizers, the invention could be implemented without the use of equalizers and having the same number of brushes as there are stator poles. In this case the brushes would be equally spaced circumferentially about the commutator.

The invention claimed is:

1. A DC motor, comprising:
a stator housing accommodating a permanent magnet stator having 2n stator poles;
a rotor, rotatably mounted confronting the stator, the rotor comprising a shaft, a rotor core fitted to the shaft, a commutator fitted to the shaft adjacent one end of the rotor core, windings wound about teeth of the rotor core and electrically connected to segments of the commutator; and
brush gear comprising a plurality of brushes in sliding contact with the commutator for transferring electrical power to the windings,
wherein the rotor core has m rotor teeth and the rotor windings has m coils each coil being wound about a respective single one of the rotor teeth and each rotor tooth supporting one of said coils, and the commutator has 2m segments with each coil being connected to a respective pair of commutator segments and at least one segment being directly connected to only one of the coils, at least one segment being directly connected to two of the coils, and at least one segment being directly connected to none of the coils.

2. The motor of claim 1, wherein each of the coils is connected to a respective pair of adjacent commutator segments.

3. The motor of claim 1, wherein the winding is arranged such that each coil is connected, at one end, to a coil wound in the opposite direction.

4. The motor of claim 1, wherein the two coils directly connected to a same commutator segment are wound in opposite directions.

5. The motor of claim 1, wherein each coil is connected to another coil wound about an adjacent tooth.

6. The motor of claim 1, wherein the two coils directly connected to a same commutator segment are wound about two adjacent teeth respectively.

7. The motor of claim 1, wherein m is equal to 3n.

8. The motor of claim 1, wherein the brush gear has less than n pairs of brushes.

9. The motor of claim 8, wherein the rotor has a plurality of equalizers electrically connecting together selected segments of the commutator; the at least one segment being directly connected to none of the coils is connected to at least one of the coils via a respective equalizer.

10. The motor of claim 9, wherein the motor has six stator poles, nine teeth, four brushes unequally spaced circumferentially about the commutator, and the commutator has eighteen segments and six equalizers, each of the equalizers electrically connecting together a respective group of four of the segments, said four segments being evenly space circumferentially about the commutator.

11. The motor of claim 9, wherein the bush gear has four brushes, the rotor has twelve teeth and the stator has eight stator poles, the brushes being unequally spaced about the commutator, and the commutator has segments and six equalizers, each equalizer electrically connecting together a respective group of four of the segments, said four segments being evenly space circumferentially about the commutator.

12. A cooling fan module for an internal combustion engine of a vehicle, comprising: a fan; a DC motor; a housing; and a DC motor according to claim 1; wherein the fan is driven by the motor and the motor is supported by the housing.

* * * * *